United States Patent
Wong et al.

(10) Patent No.: US 11,561,999 B2
(45) Date of Patent: Jan. 24, 2023

(54) DATABASE RECOVERY TIME OBJECTIVE OPTIMIZATION WITH SYNTHETIC SNAPSHOTS

(71) Applicant: RUBRIK, INC., Palo Alto, CA (US)

(72) Inventors: Christopher Wong, Mountain View, CA (US); Joshua Duncan Hight, San Francisco, CA (US); Biswaroop Palit, Redwood City, CA (US); Di Wu, Newark, CA (US)

(73) Assignee: Rubrik, Inc., Palo Alto, CA (US)

( * ) Notice: Subject to any disclaimer, the term of this patent is extended or adjusted under 35 U.S.C. 154(b) by 537 days.

(21) Appl. No.: 16/264,628

(22) Filed: Jan. 31, 2019

(65) Prior Publication Data

US 2020/0250046 A1    Aug. 6, 2020

(51) Int. Cl.
*G06F 16/27* (2019.01)
*G06F 11/14* (2006.01)
*G06F 9/46* (2006.01)

(52) U.S. Cl.
CPC .............. *G06F 16/27* (2019.01); *G06F 9/461* (2013.01); *G06F 11/1451* (2013.01); *G06F 2201/84* (2013.01)

(58) Field of Classification Search
CPC ...... G06F 16/27; G06F 11/1451; G06F 9/461; G06F 2201/84; G06F 16/273; G06F 16/275; G06F 16/278; G06F 16/128
See application file for complete search history.

(56) References Cited

U.S. PATENT DOCUMENTS

| | | | | |
|---|---|---|---|---|
| 7,111,026 B2* | 9/2006 | Sato | .................... | G06F 16/2308 707/999.203 |
| 7,225,210 B2* | 5/2007 | Guthrie, II | ............ | G06F 3/0608 |
| 7,305,421 B2* | 12/2007 | Cha | .................... | G06F 11/1471 |
| 8,041,679 B1* | 10/2011 | Narayanan | .......... | G06F 11/1471 707/648 |
| 8,732,417 B1* | 5/2014 | Stringham | .......... | G06F 11/1448 711/162 |
| 9,037,543 B2* | 5/2015 | Zha | ........................ | G06F 16/256 707/639 |
| 9,547,560 B1* | 1/2017 | Lee | .......................... | G06F 11/14 |
| 9,558,072 B1* | 1/2017 | Mam | .................... | G06F 11/1451 |
| 9,613,104 B2* | 4/2017 | Smith | ................. | G06F 16/2308 |
| 9,639,430 B2* | 5/2017 | Peretz | ................. | G06F 11/1461 |

(Continued)

*Primary Examiner* — Miranda Le
(74) *Attorney, Agent, or Firm* — Holland & Hart LLP

(57) ABSTRACT

Methods and systems for reducing the amount of time to restore a database or other application by dynamically generating and storing synthetic snapshots are described. When backing up a database, an integrated data management and storage system may acquire snapshots of the database at a snapshot frequency and acquire database transaction logs at a frequency that is greater than the snapshot frequency. In response to detecting that the database is unable to provide a database snapshot, the integrated data management and storage system may generate a synthetic snapshot of the database by instantiating a compatible version of the database locally, acquiring a previously stored snapshot of the database, applying data changes from one or more database transaction logs to the previously stored snapshot to generate the synthetic snapshot, and storing the synthetic snapshot of the database within the integrated data management and storage system.

17 Claims, 12 Drawing Sheets

(56) References Cited

U.S. PATENT DOCUMENTS

| | | | | |
|---|---|---|---|---|
| 9,703,640 | B2* | 7/2017 | Beatty | G06F 11/1469 |
| 2007/0233756 | A1* | 10/2007 | D'Souza | G06F 11/2056 |
| 2008/0243954 | A1* | 10/2008 | Augenstein | G06F 11/1451 |
| 2010/0049929 | A1* | 2/2010 | Nagarkar | G06F 11/1415 |
| | | | | 711/162 |
| 2010/0169284 | A1* | 7/2010 | Walter | G06F 11/2033 |
| | | | | 707/682 |
| 2014/0068040 | A1* | 3/2014 | Neti | G06F 9/485 |
| | | | | 709/223 |
| 2014/0108352 | A1* | 4/2014 | Ahrens | G06F 3/065 |
| | | | | 707/645 |
| 2016/0034481 | A1* | 2/2016 | Kumarasamy | G06F 16/128 |
| | | | | 707/639 |
| 2016/0077923 | A1* | 3/2016 | Zhang | G06F 3/0683 |
| | | | | 707/645 |
| 2016/0170837 | A1* | 6/2016 | Hoobler, III | G06F 11/1456 |
| | | | | 707/639 |

\* cited by examiner

```
Virtual Machine A, Version V7 {
    pBase,      ⟶  /snapshots/VM_A/s5/s5.full
    pF1,        ⟶  /snapshots/VM_A/s6/s6.delta
    pF2         ⟶  /snapshots/VM_A/s7/s7.delta
}
```

```
Virtual Machine A, Version V2 {
    pBase,      ⟶  /snapshots/VM_A/s5/s5.full
    pR1,        ⟶  /snapshots/VM_A/s4/s4.delta
    pR2,        ⟶  /snapshots/VM_A/s3/s3.delta
    pR3         ⟶  /snapshots/VM_A/s2/s2.delta
}
```

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

DATABASE RECOVERY TIME OBJECTIVE OPTIMIZATION WITH SYNTHETIC SNAPSHOTS

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 2 TB virtual disk) for the virtual machine.

DETAILED DESCRIPTION

Technology is described for reducing the amount of time to restore a particular version of a database or other application (e.g., the amount of time required to restore the most recent point in time snapshot of the database) by dynamically generating and storing synthetic snapshots. When protecting or backing up a database, an integrated data management and storage system may acquire snapshots of the database at a snapshot frequency (e.g., every hour) and acquire database transaction logs that include data changes of the database at a frequency that is greater than the snapshot frequency (e.g., every five minutes or every minute). Capturing both the database snapshots and the database transaction logs (or redo logs) for the database may allow the integrated data management and storage system to restore any point in time version of the database via application of data changes within a subset of the database transaction logs to a particular snapshot of the database that is closest to the restore point. One issue with obtaining the database snapshots from a production database is that the performance of the database may be adversely impacted by the burden of having to provide the database snapshots, especially during times when the database is overwhelmed with requests. In some cases, in response to detecting that a database is unable to provide a snapshot of the database at a second point in time, the integrated data management and storage system may generate a synthetic snapshot of the database at the second point in time by instantiating a compatible version of the database locally, acquiring a previously stored snapshot of the database at a first point in time prior to the second point in time, applying data changes from one or more database transaction logs to the previously stored snapshot of the database to generate the synthetic snapshot of the database, and storing the synthetic snapshot of the database within the integrated data management and storage system. The benefits of generating and storing synthetic snapshots locally when a production database is unable to provide a source-side snapshot include that the integrated data management and storage system may maintain recovery time objectives (RTOs) with reduced burden on the production database and may use the synthetic snapshots to reduce the number of database transaction logs that need to be applied in order to restore a particular version of the production database.

Figure 1A:
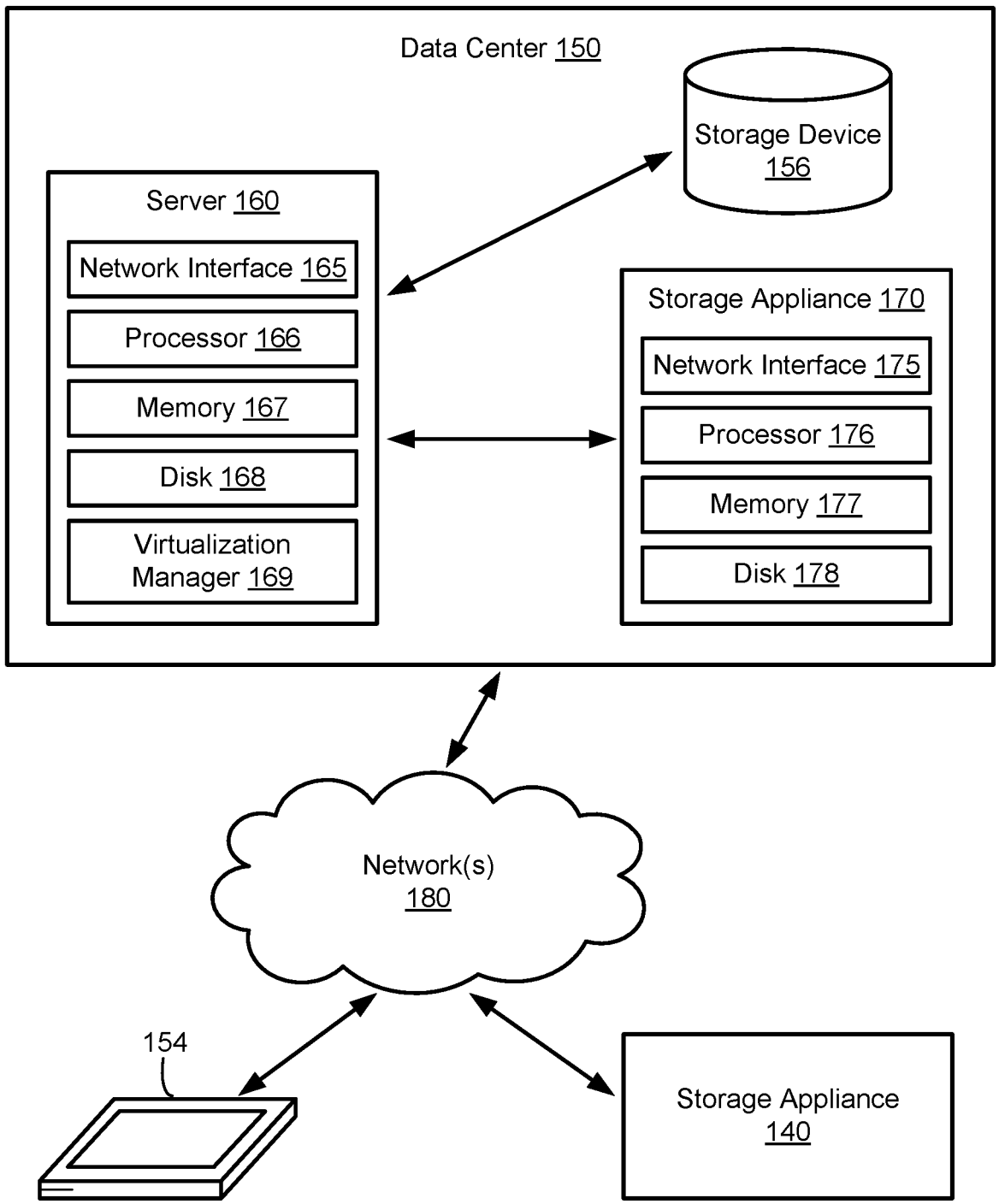
FIG. 1A depicts one embodiment of a networked computing environment.

In some cases, a storage appliance, such as storage appliance 170 in FIG. 1A, may detect that a production database is unable to provide a database snapshot of the database at a first point in time to the storage appliance (e.g., as is required per a data backup policy) if the production database denies a request for the database snapshot, the production database fails to provide the database snapshot within a threshold period of time from the request for the database snapshot (e.g., the production database fails to provide the database snapshot within ten minutes from the request), or if the first point in time is during a blackout window for the production database (e.g., a blackout window between 4 pm and 6 pm every Monday) or during a predetermined period of time during which the production database is unable to provide the database snapshot. In response to detecting that the production database is unable to provide the database snapshot, the storage appliance may identify a database engine that is compatible with the database (e.g., a database engine within a pool of database engines with the same version of the database or a version of the database with the same compatibility level), run or instantiate the database engine locally within the storage appliance, generate a synthetic snapshot of the database by acquiring one or more transaction logs for the production database and applying a subset of data changes within the one or more transaction logs to a previously stored snapshot of the production database within the storage appliance, and store the synthetic snapshot of the database within the storage appliance. In most cases, acquiring database snapshots from the production database is a much heavier resource drain on the host-side compared with transaction log ingestion. The synthetic snapshot may be stored as a full image snapshot or an incremental snapshot within the storage appliance.

In one embodiment, a storage appliance may acquire an initial snapshot of a database from a server running the database, acquire database transaction logs for the database from the server subsequent to acquiring the initial snapshot of the database (e.g., receiving the logs every minute), and generate and store synthetic snapshots of the database (e.g., generating hourly synthetic snapshots of the database) without requiring another snapshot to be captured by the server after the initial snapshot. The storage appliance may generate the synthetic snapshots using the initial snapshot, intermediary synthetic snapshots of the database stored within the storage appliance, and the database transaction logs for the database. The synthetic snapshots may be generated and stored to meet a maximum timing requirement (e.g., that not more than an hour of time separates consecutive snapshots). The database may comprise a relational database or a non-relational database (e.g., NoSQL).

A synthetic snapshot may refer to a snapshot of an application (e.g., a database application) at a particular point in time that is generated locally within a storage appliance without requiring the application itself to provide the snapshot of the application. The storage appliance may generate and store one or more synthetic snapshots of a database during a blackout window for the database in which snapshot acquisition from the database is prohibited. The one or more synthetic snapshots may be generated to adhere to a recovery point objective (e.g., that hourly snapshots of the database are captured and stored even when the database is within a blackout window). The one or more synthetic snapshots may also be generated at a frequency that is higher than a snapshot frequency for the database. For example, if a data backup policy for the database requires that snapshots of the database be captured every hour, then synthetic snapshots between the hourly snapshots may be generated and stored if a substantial number of data changes have occurred to the database since the last hourly snapshot was captured. The storage appliance may instantiate a database engine to generate the one or more synthetic snapshots and then terminate the database engine after the one or more synthetic snapshots have been generated. The storage appliance may maintain a pool of database engines running on nodes within a cluster and schedule synthetic snapshot jobs based on the availability of the database engines within the pool. Each of the nodes within the cluster may run one or more database engines and the size of the pool of database engines may increase or decrease over time depending on the number of nodes within the cluster. The size of the pool of database engines may also increase or decrease over time depending on the available memory or disk space within each of the nodes. For example, each node may support one database engine per 500 GB of available disk space.

In some embodiments, a storage appliance may generate a synthetic snapshot of a database prior to the next scheduled snapshot of the database if the storage appliance detects that a number of data changes that have occurred to the database (or a particular table within the database) since the most recent snapshot of the database is greater than a threshold number of data changes, that an aggregate file size for one or more transaction logs associated with the data changes that occurred to the database since the most recent snapshot of the database was captured is greater than a threshold file size (e.g. that the combined file sizes of the one or more transaction logs is greater than 2 TB), or that the total number of the one or more transaction logs since the most recent snapshot of the database is greater than a threshold number of log files. The one or more transaction logs may comprise database transaction logs or redo logs for the database. The one or more transaction logs may be acquired from a server running the database on a periodic basis. In one example, the storage appliance may capture and store database snapshots of the database every 24 hours and database transaction logs every five minutes; upon detection that the data change rate is above a threshold rate or that the combined file sizes for the one or more transaction logs is greater than a threshold file size, the storage appliance may generate and store a synthetic snapshot associated with a point in time version of the database that is prior to the next daily snapshot of the database (e.g., the synthetic snapshot may correspond with a state of the database that is two hours after the previous daily snapshot of the database).

In addition to generating synthetic snapshots, a database engine may be used to detect anomalies occurring within the database snapshots. In one example, if the number of updates to the database between consecutive snapshots or the number of updates to a particular table associated with the database exceeds a threshold number of updates, then the database engine may output an alert specifying that an anomaly has been detected. In some cases, database engines within a pool of database engines that are not assigned to generating synthetic snapshots may be used to perform the anomaly detection. The anomaly detection may also be performed while the synthetic snapshots are being generated by the database engines or prior to the generation of the synthetic snapshots.

In response to an instruction from a hardware server to recover a database to a particular version of the database corresponding with a particular point in time, a storage appliance may identify the closest-in-time synthetic snapshot to the particular point in time and generate the particular version of the database by applying data changes from transaction logs to the closest-in-time synthetic snapshot. The storage appliance may then allow the hardware server to read the particular version of the database and write data updates to the particular version of the database. As an example, in response to detecting a database failure, an application running on the hardware server may temporarily use the storage appliance as a primary storage system for reading from and writing to the particular version of the database. After the particular version of the database has been generated and stored, the storage appliance may share or transfer files associated with the particular version of the database to the hardware server or to an external application using the server message block (SMB) protocol or the network file system (NFS) protocol. The storage appliance may allow the hardware server or the external application to write to the restored version of the database; in this case, the database may act as a live mount database.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
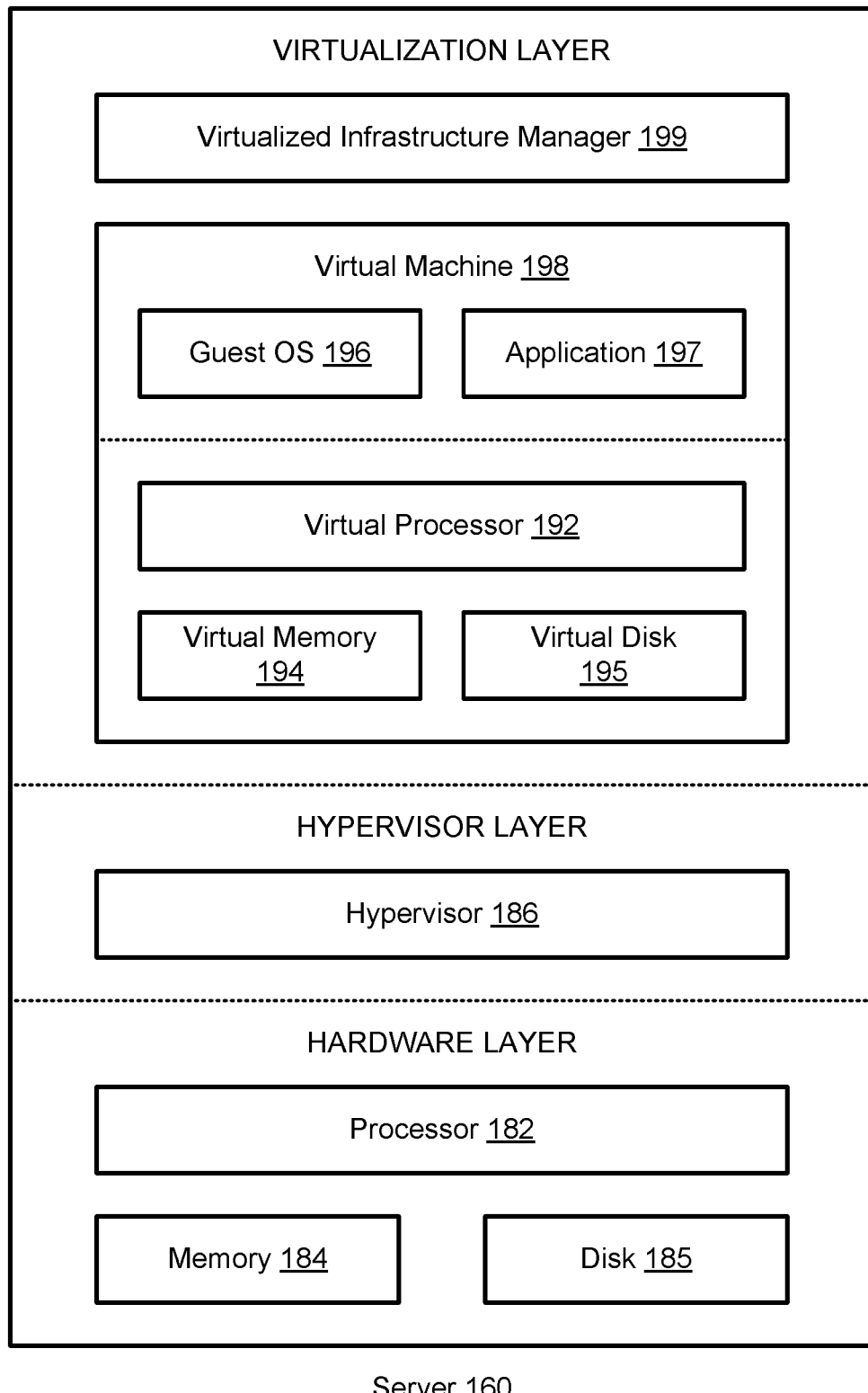
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
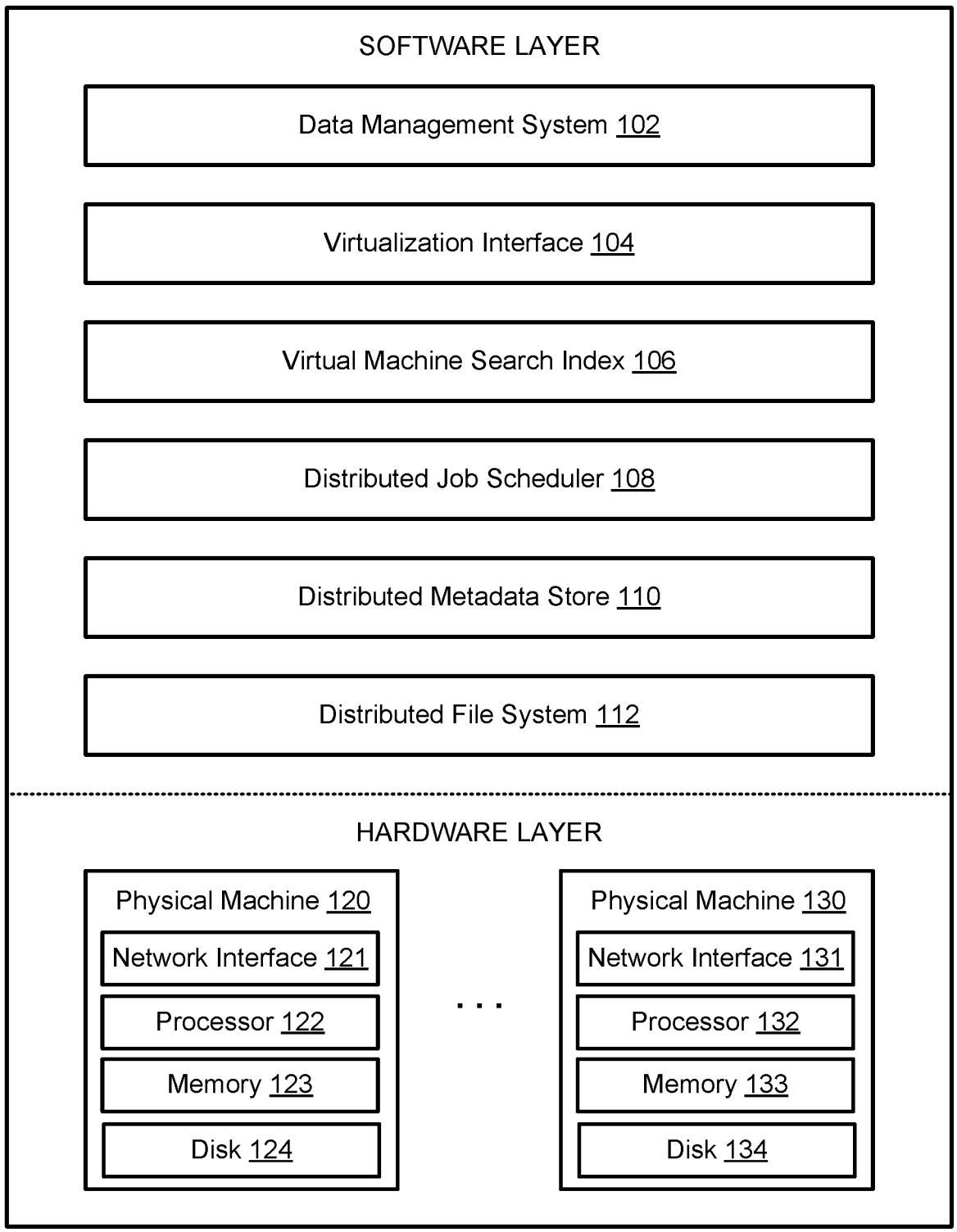
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/ and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine.

The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
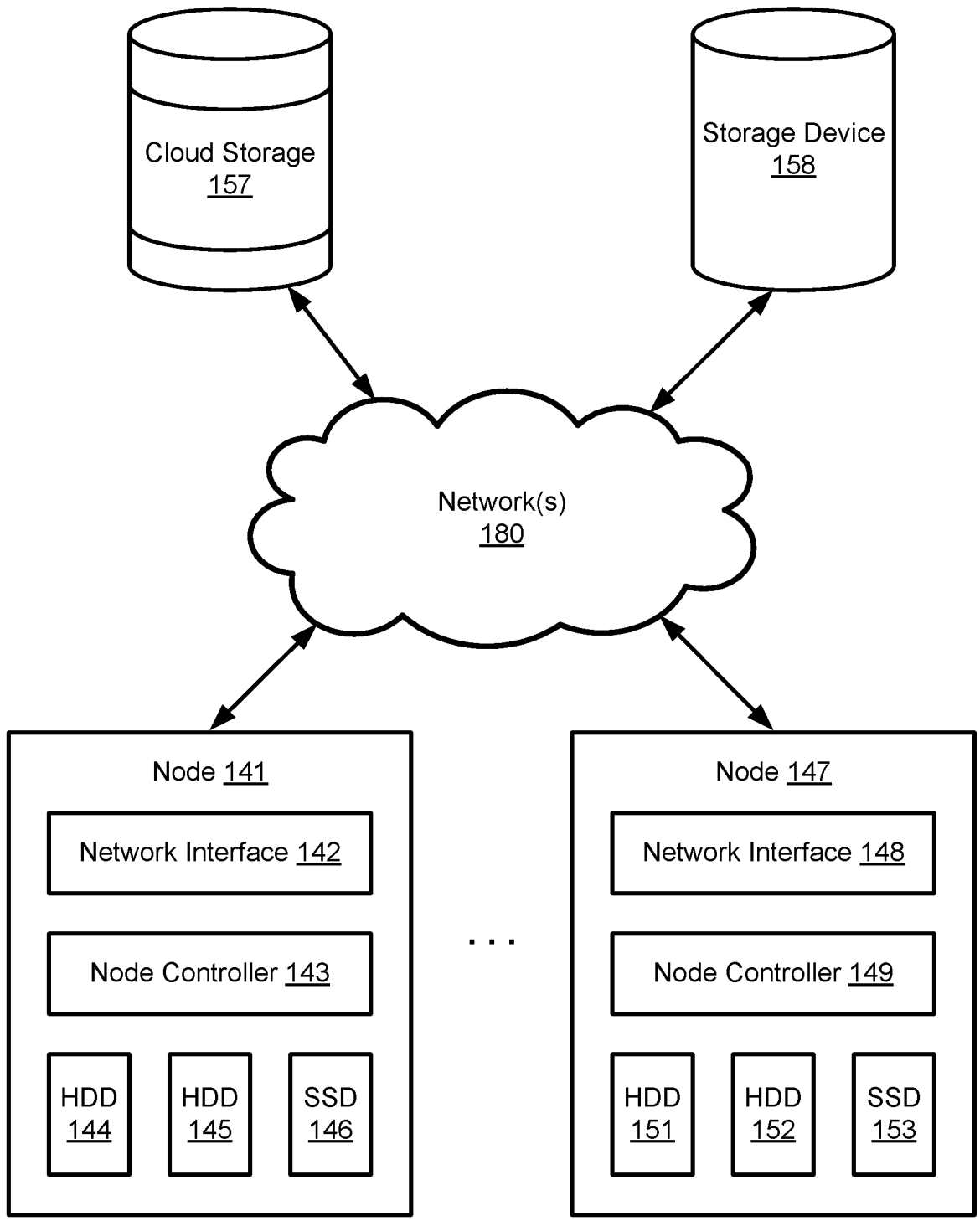
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2F depict various embodiments of sets of files and data structures (e.g., implemented using merged files) associated with managing and storing snapshots of virtual machines.

Figures 2A, 2B, 2C:
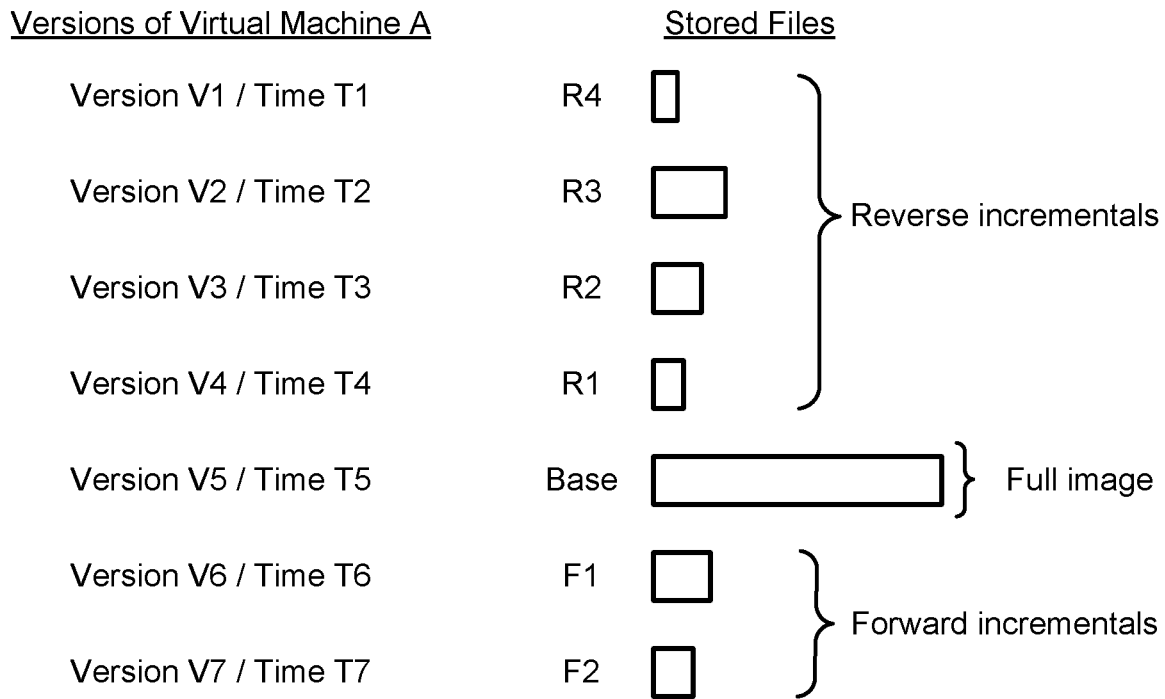
FIGS. 2A-2F depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
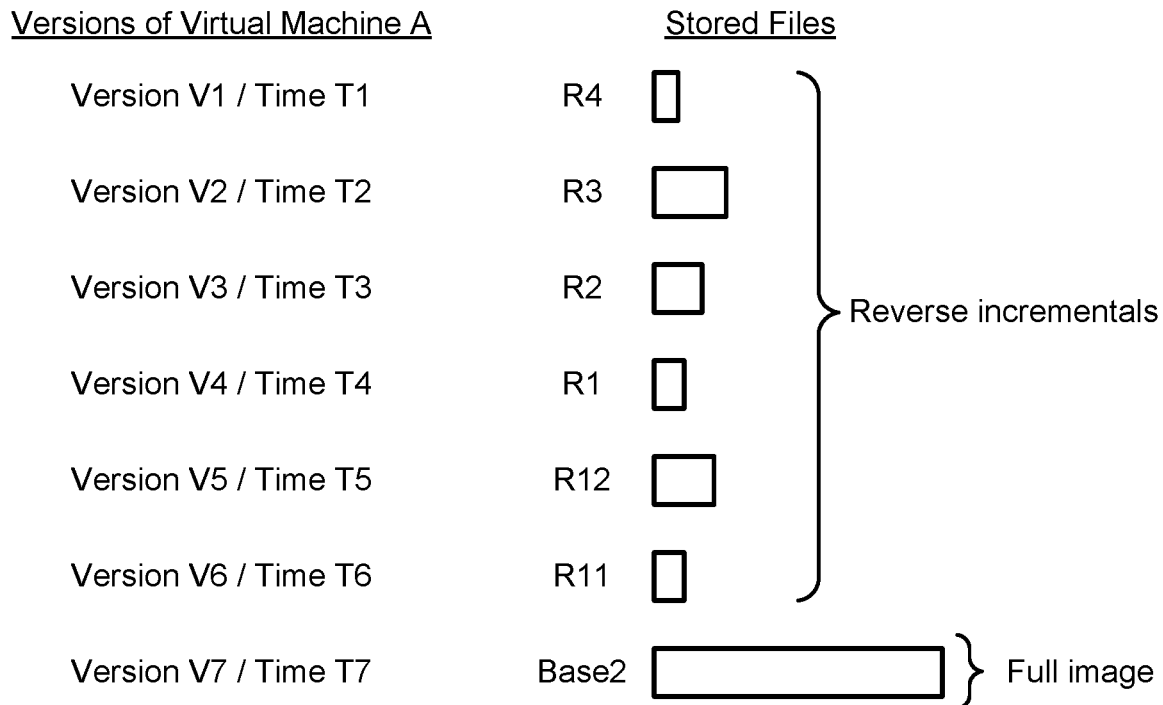

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image.

To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figure 3A:
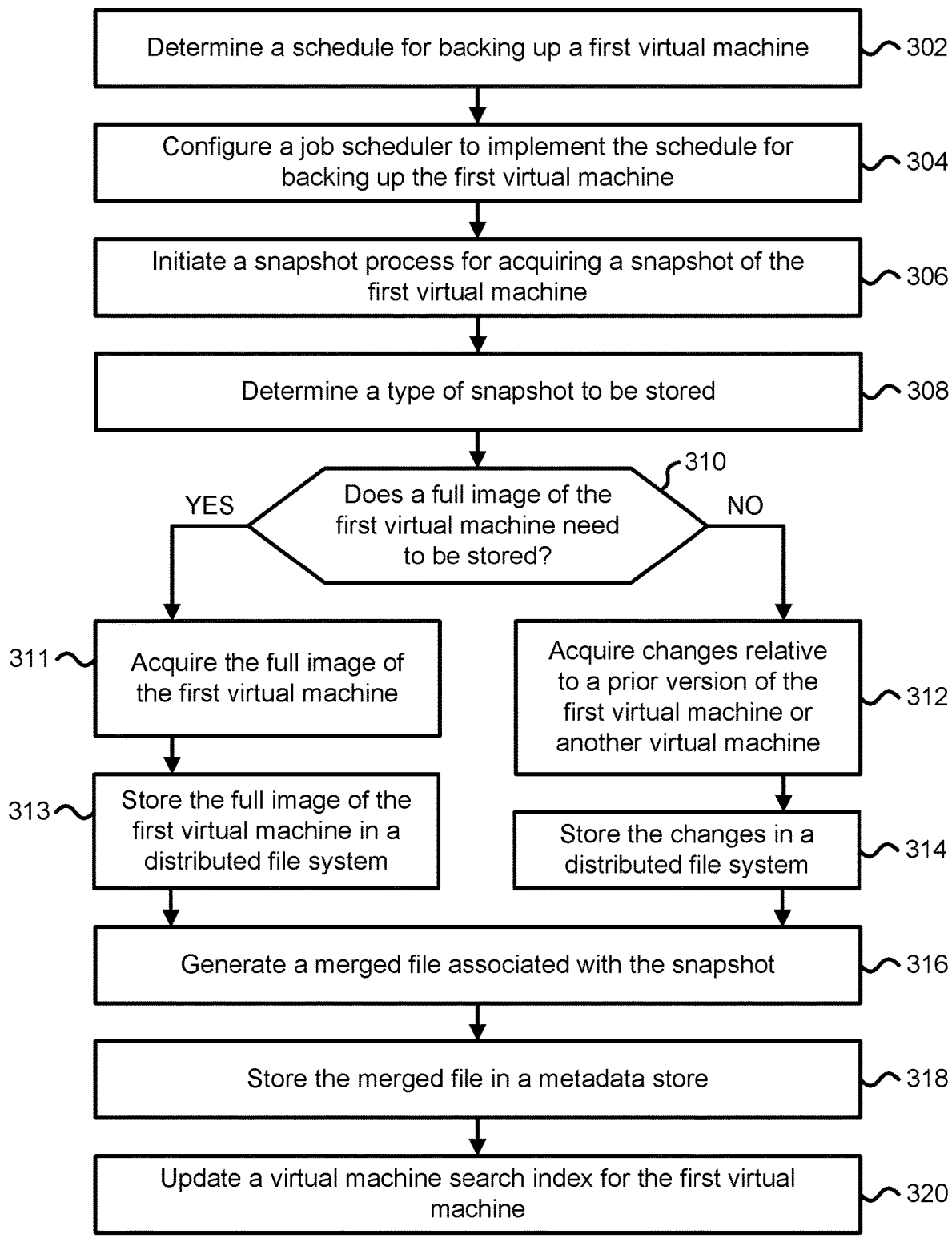
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
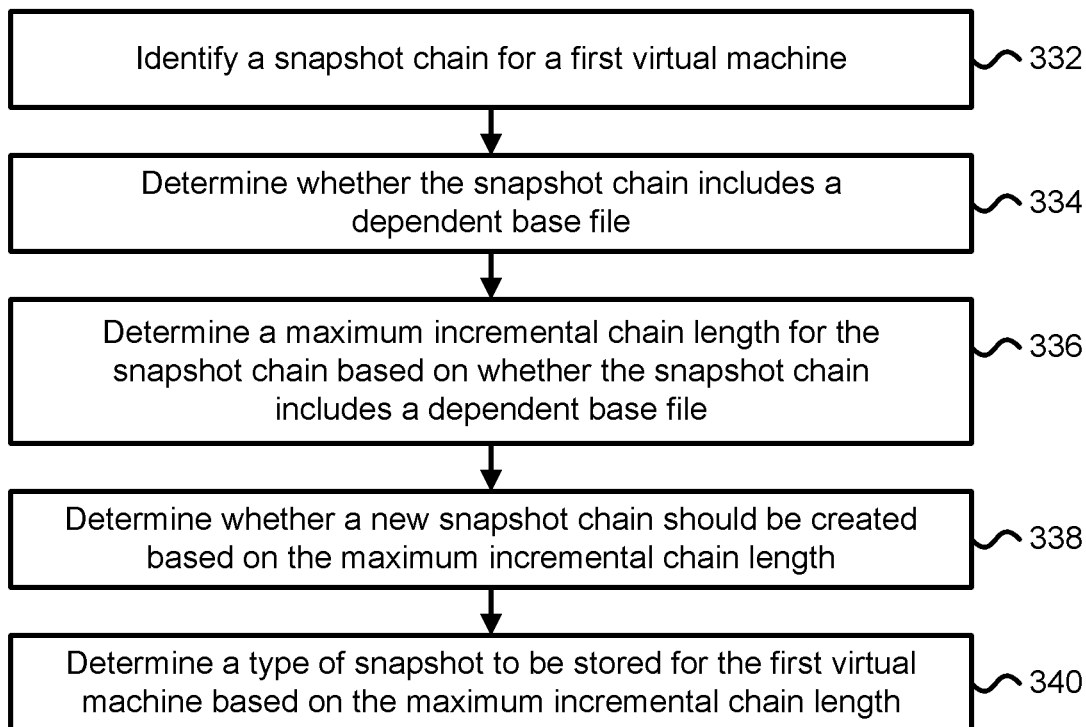
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
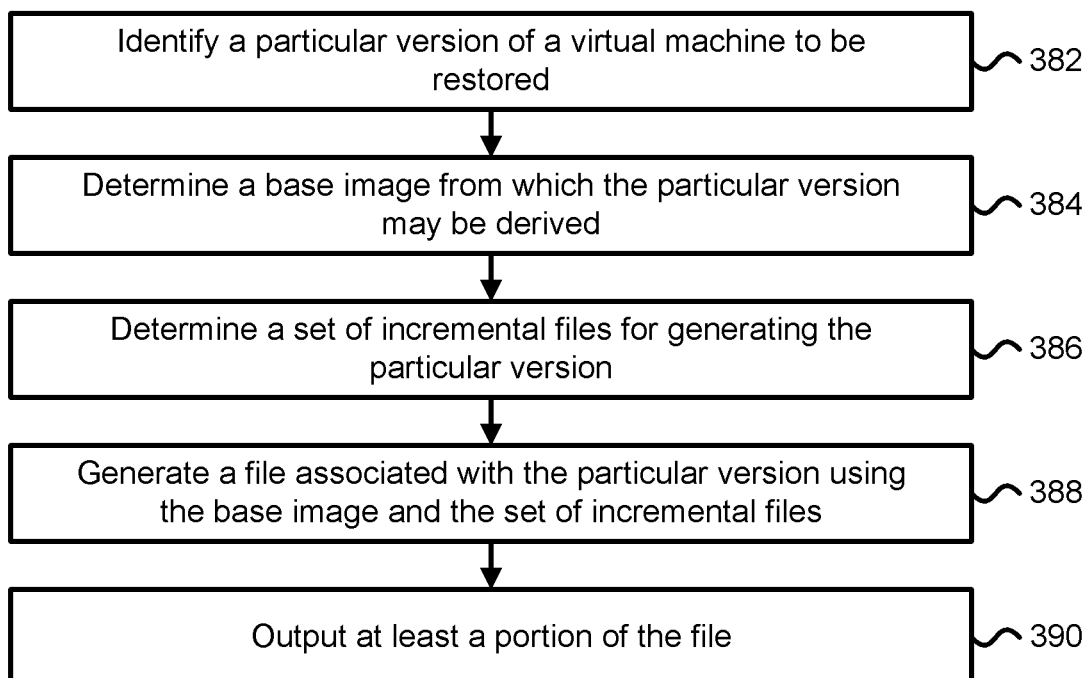
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine.

Figure 4A:
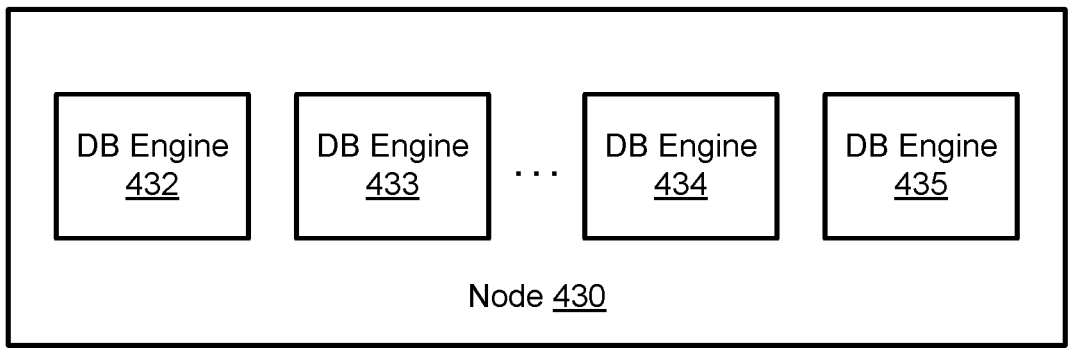
FIG. 4A depicts one embodiment of a data storage node running a plurality of database engines.

FIG. 4A depicts one embodiment of a data storage node 430 running a plurality of database engines including database engines DB Engines 432-435. The data storage node 430 may correspond with node 141 in FIG. 1D. The database engines executed by the data storage node 430 may correspond with the same database application or different database applications. In one example, DB Engine 432 may comprise a first structured query language (SQL) server (e.g., SQL Server 2016), DB Engine 433 may comprise a second SQL server (e.g., SQL Server 2017), and DB Engine 434 may comprise an open source database application. A compatibility level associated with the first SQL server may be supported by the second SQL server. In one example, the DB Engine 433 may be used to generate synthetic snapshots for databases comprising SQL Server 2017 and SQL Server 2016 while the DB Engine 432 may be used to generate synthetic snapshots only for databases comprising SQL Server 2016. A database engine scheduler running on the data storage node 430 may instantiate database engines of a particular type (e.g., running a particular open source database application) and terminate the database engines over time based on the estimated need for the database engines and/or the number of synthetic snapshots scheduled to be generated by the data storage node 430. The database engine scheduler may manage a synthetic snapshot job queue for each of the database engines and assign synthetic snapshot jobs to the job queues based on queue lengths for the job queues and the particular types of database engines running on the data storage node. If the job queue lengths for job queues associated with a particular type of database engine (e.g., each comprising the same open source database application) have all exceeded a threshold queue length, then the database engine scheduler may instantiate one or more new database engines of the particular type. In some cases, the database engine scheduler may stagger the generation of synthetic snapshots in order to manage the job queue lengths for the synthetic snapshot job queues.

Figure 4B:
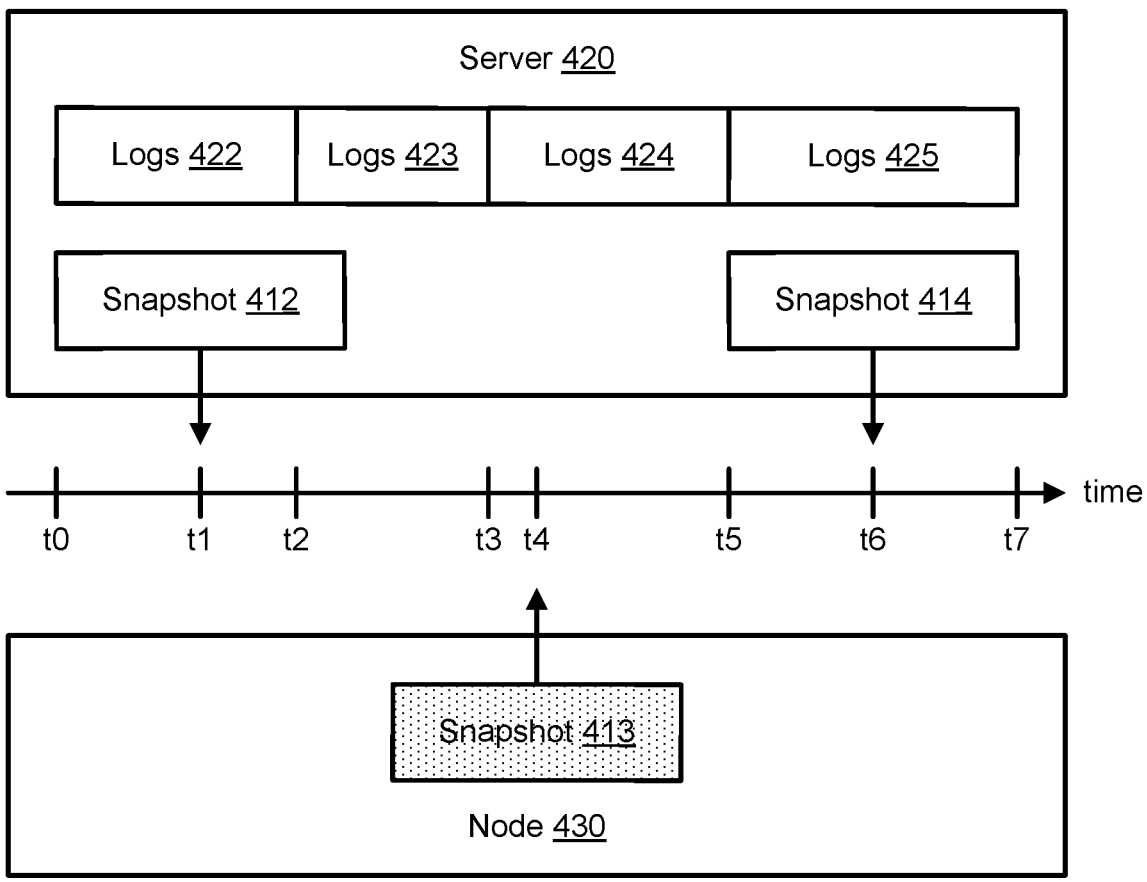
FIG. 4B depicts one embodiment of a server running a protected database in communication with a data storage node.

FIG. 4B depicts one embodiment of a server 420 in communication with a data storage node 430. The database transaction logs and database snapshots generated by the server 420 may be transferred to the data storage node 430 and synthetic snapshots may be generated by the data storage node 430 using the transferred database transaction logs and the database snapshots. The server 420 may correspond with server 160 in FIG. 1A and the data storage node 430 may correspond with node 141 in FIG. 1D. The server 420 may run a database not depicted and transfer a first snapshot 412 corresponding with a state of the database at time t1 and a second snapshot 414 corresponding with a state of the database at time t6 to data storage node 430. The first snapshot 412 and the second snapshot 414 may be transferred to the data storage node 430 in response to a request for snapshots of the database at times t1 and t6. In one example, the snapshot 412 may correspond with a state of the database at 2 pm and the snapshot 414 may correspond with a state of the database at 4 pm; although hourly snapshots of the database may be required to satisfy a data backup policy or an RPO for the database, the database may have been unable to provide a database snapshot at time t4 (e.g., at 3 pm). In this case, the data storage node 430 may be required to generate a synthetic snapshot 413 in order to satisfy the data backup policy.

As depicted in FIG. 4B, the server 420 may also transfer database transaction logs 422-425 for the database to the data storage node 430 over time. In one example, database transaction logs for the database may be transferred to the data storage node 430 every five minutes or every minute. The database transaction logs (or log files) 422 may comprise one or more transaction logs (e.g., 50 log files) that include data changes that have occurred to the database between times t0 and t2. The log files 423 may comprise one or more transaction logs that include data changes that have occurred to the database between times t2 and t3. The log files 424 may comprise one or more transaction logs that include data changes that have occurred to the database between times t3 and t5. The log files 425 may comprise one or more transaction logs that include data changes that have occurred to the database between times t5 and t7. Metadata within the database transaction logs may be used to align the log files with various points in time. For example, metadata associated with or stored within log files 422 may specify when the data changes stored within the log files 422 occurred between 1:52 pm and 2:12 pm. In one embodiment, the data storage node 430 may generate the synthetic snapshot 413 by accessing snapshot 412 stored within the data storage node 430, accessing log files 422-424 stored within the data storage node 430, determining data changes that occurred to the database from time t1 to time t4 using the log files 422-424, and generating the synthetic snapshot 413 by applying the data changes that occurred to the database between times t1 and t4 to the snapshot 412.

Figure 4C:
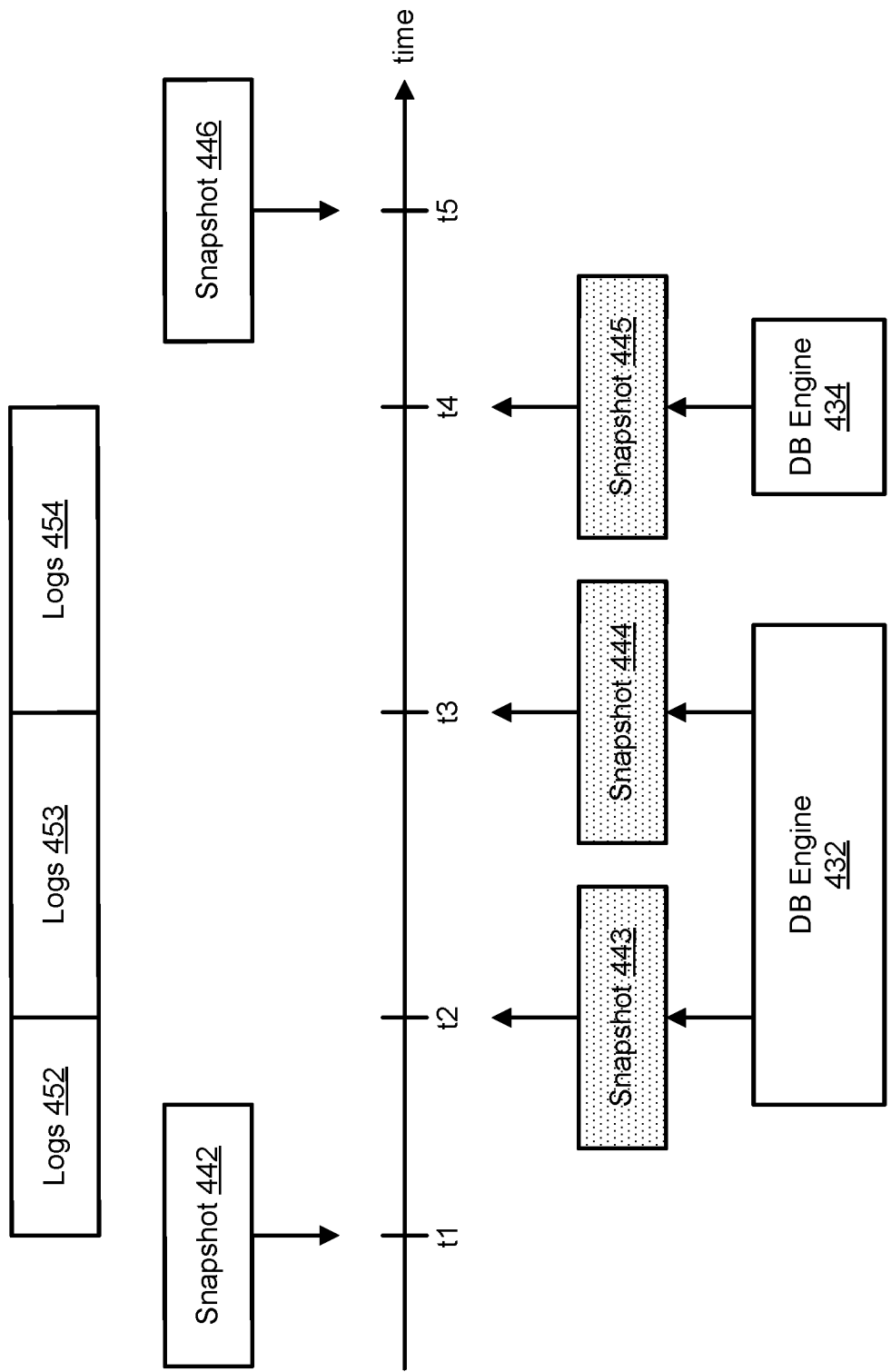
FIG. 4C depicts one embodiment of various electronic files used by one or more database engines to generate one or more synthetic snapshots.

FIG. 4C depicts one embodiment of files used by one or more database engines to generate one or more synthetic snapshots. As depicted, database transaction log files 452-454, snapshot 442, and snapshot 446 may be acquired by a data storage node, such as data storage node 430 in FIG. 4B, from a server, such as server 420 in FIG. 4B. The snapshot 442 may comprise a snapshot of a database at time t1 and snapshot 446 may comprise a snapshot of the database at time t5. The log files 452 may comprise a plurality of transaction logs associated with data changes made to the database occurring between times t1 and t2. The log files 453 may comprise a plurality of transaction logs associated with data changes made to the database occurring between times t2 and t3. The log files 454 may comprise a plurality of transaction logs associated with data changes made to the database occurring between times t3 and t4.

As depicted in FIG. 4C, a first database engine DB Engine 432 may be instantiated or executed by a data storage node to generate synthetic snapshot 443 and synthetic snapshot 444. To generate the synthetic snapshot 443, the first database engine DB Engine 432 may acquire the snapshot 442 transferred to and stored within the data storage node, acquire database transaction log files 452, and generate the synthetic snapshot 443 by applying the log files 452 to the snapshot 442. To generate the synthetic snapshot 444, the first database engine DB Engine 432 may acquire database transaction log files 453 and generate the synthetic snapshot 444 by applying the log files 453 to the synthetic snapshot 443. After the two synthetic snapshots have been generated, the data storage node may terminate the first database engine DB Engine 432. The data storage node may instantiate or execute a second database engine DB Engine 434 to generate synthetic snapshot 445. To generate the synthetic snapshot 445, the second database engine DB Engine 434 may acquire database transaction log files 454 and generate the synthetic snapshot 445 by applying the log files 454 to the synthetic snapshot 444. The data storage node may instantiate and/or terminate database engines over time in order to conserve power and compute resources and to reduce costs associated with executing the database engines. In some embodiments, the data storage node (or a cluster of data storage nodes) may detect that a snapshot of the database at time t2 cannot be obtained from a server running the database and in response identify a database engine among a pool of database engines or instantiate the database engine in order to generate the synthetic snapshot 443 comprising a snapshot of the database at time t2.

In some embodiments, although an SLA policy or a data backup policy for a database may require database snapshots to be captured every 24 hours, a storage appliance may generate and store synthetic snapshots every hour (and without intervention by the server hosting the database) in order to improve the recovery time required to recover a particular version of the database. In this case, at most one hour of transaction logs will need to be applied to one of the synthetic snapshots in order to recover the particular version of the database.

Figure 5A:
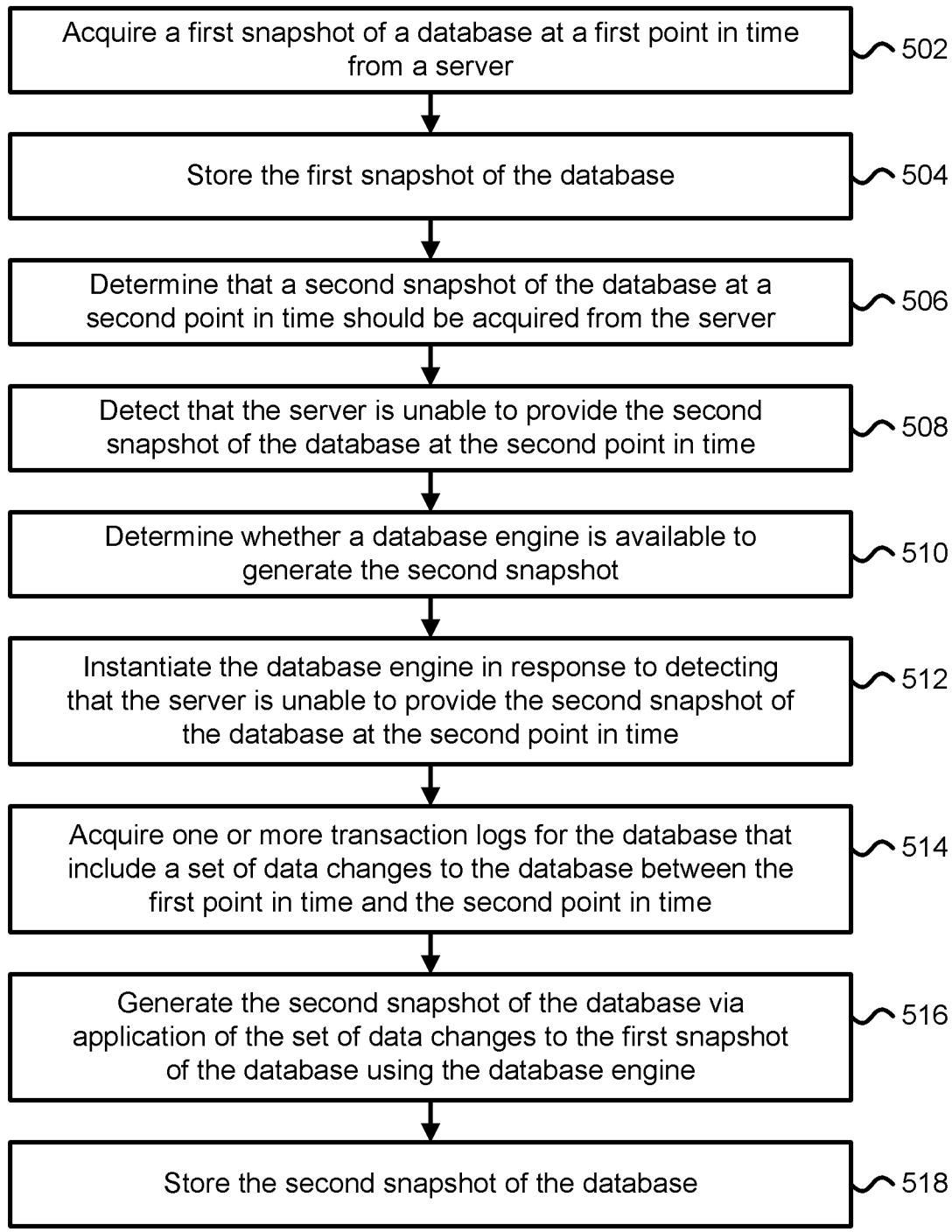
FIG. 5A is a flowchart describing one embodiment of a process for generating and storing synthetic snapshots.

FIG. 5A is a flowchart describing one embodiment of a process for generating and storing synthetic snapshots. In one embodiment, the process of FIG. 5A may be performed by a storage appliance, such as storage appliance 170 or storage appliance 140 in FIG. 1A. The process of FIG. 5A may be performed by a data storage node, such as data storage node 141 in FIG. 1D.

In step 502, a first snapshot of a database at a first point in time is acquired from a server. The first snapshot of the database may be generated by the server, such as server 420 in FIG. 4B and may be acquired by a data storage node, such as node 430 in FIG. 4B. In step 504, the first snapshot of the database is stored. The first snapshot may be stored within a non-volatile memory of the data storage node. In step 506, it is determined that a second snapshot of the database at a second point in time subsequent to the first point in time should be acquired from the server. In one embodiment, a data backup policy may require that snapshots of the database be captured on a periodic basis (e.g., every hour) and the second snapshot of the database may correspond with the next hourly snapshot of the database.

In step 508, it is detected that the server is unable to provide the second snapshot of the database at the second point in time. In some cases, a data storage node may detect that the database is unable to provide the second snapshot of the database at the second point in time if the database or the server running the database denies a request for the second snapshot, the database fails to provide the second snapshot within a threshold period of time from a request for the second snapshot (e.g., the database fails to provide the second snapshot within five minutes from the request), or if the second point in time is during a blackout window for the database. In some cases, a lookup table of blackout time periods during which database snapshots cannot be requested from the database may be used by the data storage node to determine whether the server is unable to provide the second snapshot of the database at the second point in time. In step 510, it is determined whether a database engine is available to generate the second snapshot of the database at the second point in time. In one embodiment, upon detection that the server is unable to provide the second snapshot of the database, a data storage node may generate a synthetic snapshot corresponding with a state of the database at the second point in time using the database engine. The data storage node may determine that the database engine is available to generate a second snapshot if a database engine among a pool of database engines managed by the data storage node is available or the database engine has a queue length for running synthetic snapshot jobs less than a threshold queue length (e.g., the synthetic snapshot job queue has less than three jobs).

In step 512, the database engine is instantiated in response to detecting that the server is unable to provide the second snapshot of the database at the second point in time. In step 514, one or more transaction logs for the database that include a set of data changes to the database between the first point in time and the second point in time are acquired. The one or more transaction logs for the database may be acquired and stored on a periodic basis from the server. In step 516, the second snapshot of the database is generated via application of the set of data changes to the first snapshot of the database using the database engine. In step 518, the second snapshot of the database is stored. The second snapshot of the database may be generated by the data storage node and stored as a synthetic snapshot of the database at the second point in time.

Figure 5B:
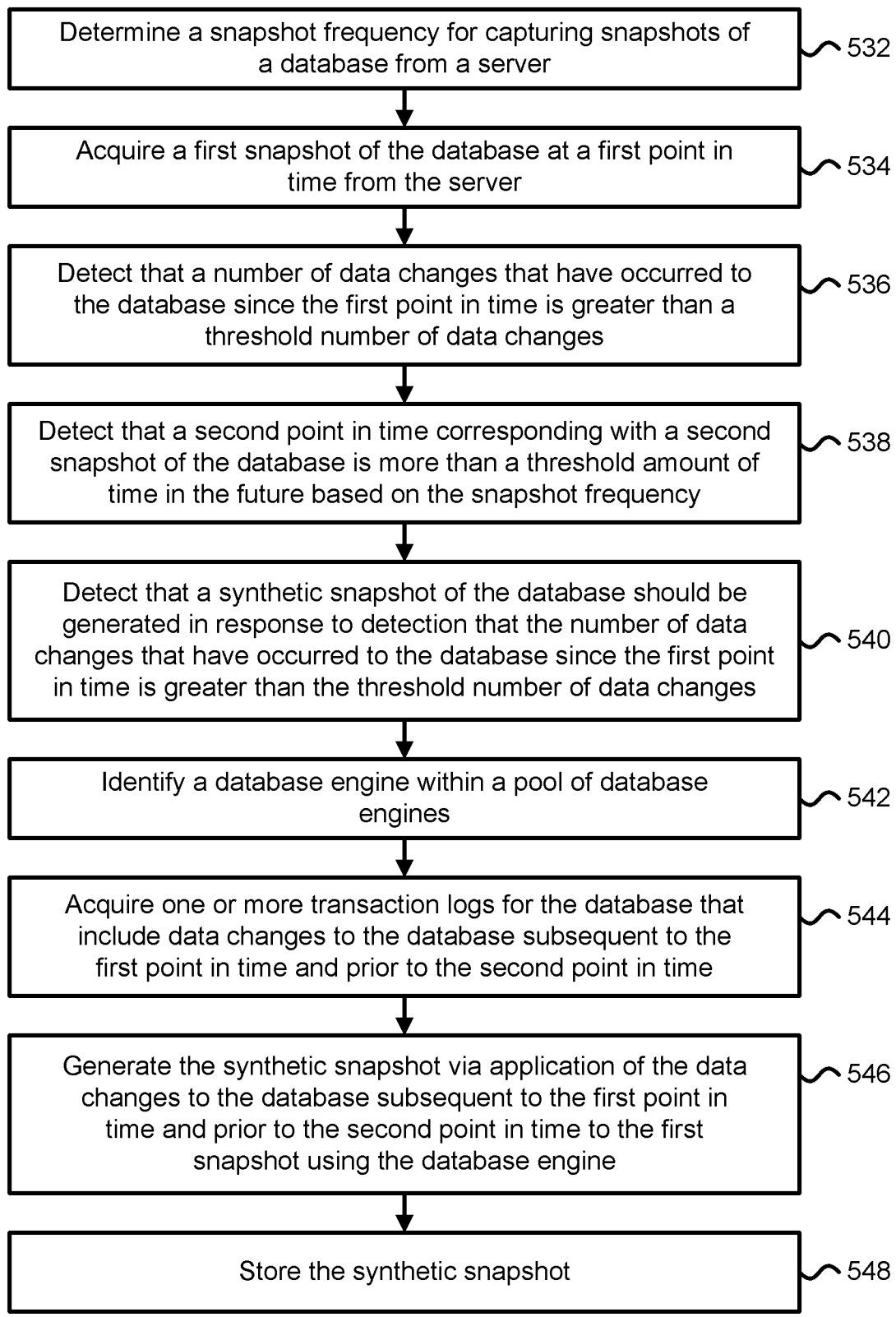
FIG. 5B is a flowchart describing another embodiment of a process for generating and storing synthetic snapshots.

FIG. 5B is a flowchart describing another embodiment of a process for generating and storing synthetic snapshots. In one embodiment, the process of FIG. 5B may be performed by a storage appliance, such as storage appliance 170 or storage appliance 140 in FIG. 1A. The process of FIG. 5B may be performed by a data storage node, such as data storage node 147 in FIG. 1D.

In step 532, a snapshot frequency for capturing snapshots of a database from a server is determined. The snapshot frequency may be set depending on a recovery point objective for the database or a data backup policy for the database (e.g., specifying that database snapshots should be captured every hour). In step 534, a first snapshot of the database at a first point in time is acquired from the server. The first snapshot of the database may be stored using non-volatile memory within a data storage node. In step 536, it is detected that a number of data changes that occurred to the database since the first point in time is greater than a threshold number of data changes. In one example, a data storage node may detect that a date change rate associated with the database since the first point in time is greater than a threshold data change rate. In another example, a data storage node may detect that an aggregate file size for one or more transaction logs associated with the data changes that occurred to the database since the first point in time is greater than a threshold file size (e.g., the aggregate file size is greater than 10 TB). The data storage node may compute the aggregate file size as the one or more transaction logs are received from the server and stored within the data storage node on a periodic basis.

In step 538, it is detected that a second point in time corresponding with a second snapshot of the database is more than a threshold amount of time in the future based on the snapshot frequency. In one example, the first point in time corresponding with the first snapshot of the database may comprise 1:00 pm and the second point in time corresponding with the second snapshot of the database may comprise 2:00 pm; if the threshold amount of time is ten minutes, then if it is detected prior to 1:50 pm that the number of data changes that occurred to the database since the first point in time is greater than the threshold number of data changes, then the data storage node may generate a synthetic snapshot for the database even though the snapshot frequency does not require it. One benefit of generating the synthetic snapshot corresponding with a point in time prior to the second point in time is that the recovery time for the database may be improved.

In step 540, it is detected that a synthetic snapshot of the database should be generated in response to detection that the number of data changes that occurred to the database since the first point in time is greater than the threshold number of data changes. In step 542, a database engine within a pool of database engines is identified. In one example, the database engine may comprise the database engine among the pool of database engines with the smallest job queue length for generating synthetic snapshots. In step 544, one or more transaction logs for the database that include data changes to the database subsequent to the first point in time and prior to the second point in time are acquired. In step 546, the synthetic snapshot is generated via application of the data changes to the database subsequent to the first point in time and prior to the second point in time to the first snapshot using the database engine. The database engine may load the first snapshot of the database and then apply the data changes to the database that occurred subsequent to the first point in time. In step 548, the synthetic snapshot is stored. After the synthetic snapshot has been generated by the data storage node, the data storage node may terminate the database engine.

One embodiment of the disclosed technology includes acquiring a first snapshot of a database at a first point in time from a server executing the database, detecting that the server is unable to provide a second snapshot of the database at a second point in time subsequent to the first point in time, acquiring one or more transaction logs for the database that include a set of data changes to the database between the first point in time and the second point in time, instantiating or executing a database engine within a cluster of data storage nodes in response to detecting that the server is unable to provide the second snapshot of the database at the second point in time, generating the second snapshot of the database via application of the set of data changes to the first snapshot of the database using the database engine, terminating the database engine from the cluster of data storage nodes, and storing the second snapshot of the database within the cluster of data storage nodes.

One embodiment of the disclosed technology includes a memory in communication with one or more processors. The one or more processors and memory may be part of a data storage node within a cluster of data storage nodes. The one or more processors configured to acquire a first snapshot of a database at a first point in time from a server executing the database and detect that the server is unable to provide a second snapshot of the database at a second point in time subsequent to the first point in time. The one or more processors configured to acquire one or more transaction logs for the database that include a set of data changes to the database between the first point in time and the second point in time and instantiate a database engine in response to detection that the server is unable to provide the second snapshot of the database at the second point in time. The one or more processors configured to generate the second snapshot of the database via application of the set of data changes to the first snapshot of the database using the database engine and terminate the database engine. The one or more processors configured to store the second snapshot of the database using the memory.

One embodiment of the disclosed technology includes determining a snapshot frequency for capturing snapshots of a database from a server, acquiring a first snapshot of the database at a first point in time from the server, detecting that a number of data changes that have occurred to the database since the first point in time is greater than a threshold number of data changes, detecting that a second point in time corresponding with a second snapshot of the database is more than a threshold amount of time in the future based on the snapshot frequency, detecting that a synthetic snapshot of the database should be generated in response to detecting that the number of data changes that have occurred to the database since the first point in time is greater than the threshold number of data changes and detecting that the second point in time corresponding with the second snapshot of the database is more than the threshold amount of time in the future, identifying a database engine to generate the synthetic snapshot for the database, acquiring one or more transaction logs for the database that include a set of data changes to the database subsequent to the first point in time and prior to the second point in time, generating the synthetic snapshot via application of the set of data changes to the database to the first snapshot using the database engine, and storing the synthetic snapshot.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system at a storage appliance, comprising:

determining, by the storage appliance, a snapshot frequency for capturing snapshots of a database from a server, wherein the server is separate from the storage appliance;

acquiring, at the storage appliance, a first snapshot of a database at a first point in time from a server executing the database;

determining, by the storage appliance, that a quantity of one or more transaction logs for the database acquired between the first point in time and a second point in time exceeds a pre-determined threshold value, wherein the one or more transaction logs for the database include a set of data changes to the database between the first point in time and the second point in time subsequent to the first point in time, and wherein the one or more transaction logs are acquired from the server at a frequency that is higher than the snapshot frequency for the database;

requesting, by the storage appliance based at least in part on determining that the quantity of one or more transaction logs acquired between the first point in time and the second point in time exceeds the pre-determined threshold value, that the server provide a second snapshot of the database at the second point in time;

detecting, by the storage appliance, that the server is unable to provide the second snapshot of the database to the storage appliance within a threshold time period that begins at a time that the server is requested to provide the second snapshot;

determining, by the storage appliance, that a synthetic snapshot of the database is to be generated based at least in part on determining that the quantity of one or more transaction logs for the database exceeds a pre-determined threshold value and based at least in part on detecting that the server is unable to provide the second snapshot of the database within the threshold time period;

instantiating, by the storage appliance, a database engine to generate the synthetic snapshot for the database;

generating, by the storage appliance, the synthetic snapshot of the database by applying the set of data changes to the first snapshot of the database using the database engine;

terminating, by the storage appliance, the database engine after generating the synthetic snapshot using the database engine; and storing, within the storage appliance, the synthetic snapshot of the database.

2. The method of claim 1, wherein detecting that the server is unable to provide the second snapshot of the database includes determining a blackout window for the database in which snapshot acquisition from the database is prohibited and detecting that the second point in time is during the blackout window for the database.

3. The method of claim 1, further comprising:
determining a compatibility level for the database; and
determining the database engine based at least in part on the compatibility level for the database.

4. The method of claim 1, further comprising:
detecting that the server is unable to provide a third snapshot of the database at a third point in time subsequent to the second point in time;
acquiring one or more additional transaction logs for the database that include a second set of data changes to the database between the second point in time and the third point in time; and
generating the third snapshot of the database using the second set of data changes and the synthetic snapshot of the database using the database engine.

5. The method of claim 1, wherein the one or more transaction logs for the database comprise a plurality of database transaction logs.

6. The method of claim 1, wherein storing the synthetic snapshot of the database includes storing the synthetic snapshot as an incremental snapshot.

7. The method of claim 1, wherein the database comprises a relational database.

8. The method of claim 1, further comprising:
detecting that a quantity of updates to the database between the first point in time and the second point in time has exceeded a threshold quantity of updates; and
outputting an alert specifying that a database anomaly has been detected.

9. A data management system at a storage appliance, comprising:
a memory storing instructions; and
one or more hardware processors communicatively coupled to the memory and configured by the instructions to perform operations comprising:
determining, by the storage appliance, a snapshot frequency for capturing snapshots of a database from a server, wherein the server is separate from the storage appliance;
acquiring, at the storage appliance, a first snapshot of a database at a first point in time from a server executing the database;
determining, by the storage appliance, that a quantity of one or more transaction logs for the database acquired between the first point in time and a second point in time exceeds a pre-determined threshold value, wherein the one or more transaction logs for the database include a set of data changes to the database between the first point in time and the second point in time subsequent to the first point in time, and wherein the one or more transaction logs are acquired from the server at a frequency that is higher than the snapshot frequency for the database;
requesting, by the storage appliance based at least in part on determining that the quantity of one or more transaction logs acquired between the first point in time and the second point in time exceeds the pre-determined threshold value, that the server provide a second snapshot of the database at the second point in time;
detecting, by the storage appliance, that the server is unable to provide the second snapshot of the database to the storage appliance within a threshold time period that begins at a time that the server is requested to provide the second snapshot;
determining, by the storage appliance, that a synthetic snapshot of the database is to be generated based at least in part on determining that the quantity of one or more transaction logs for the database exceeds a pre-determined threshold value and based at least in part on detecting that the server is unable to provide the second snapshot of the database within the threshold time period;
instantiating, by the storage appliance, a database engine to generate the synthetic snapshot for the database;
generating, by the storage appliance, the second synthetic snapshot of the database by applying of the set of data changes to the first snapshot of the database using the database engine;
terminating, by the storage appliance, the database engine after generating the synthetic snapshot using the database engine; and
storing, within the storage appliance, the synthetic snapshot of the database.

10. The data management system of claim 9, wherein the operations comprise:
determining a blackout window for the database in which snapshot acquisition from the database is prohibited and detect that the second point in time is during the blackout window for the database.

11. The data management system of claim 9, wherein the operations comprise:
determining a compatibility level for the database and determining the database engine based at least in part on the compatibility level for the database.

12. The data management system of claim 9, wherein the operations comprise:
detecting that the server is unable to provide a third snapshot of the database at a third point in time subsequent to the second point in time and acquiring one or more additional transaction logs for the database that include a second set of data changes to the database between the second point in time and the third point in time; and
using the database engine to generate the third snapshot of the database based at least in part on the second set of data changes and the synthetic snapshot of the database.

13. The data management system of claim 9, wherein the one or more transaction logs for the database comprise a plurality of database transaction logs.

14. The data management system of claim 9, wherein the synthetic snapshot is stored as a full image snapshot.

15. The data management system of claim 9, wherein the database comprises a non-relational database.

16. A method for operating a data management system at a storage appliance, comprising:

determining, by the storage appliance, a snapshot frequency for capturing snapshots of a database from a server, wherein the server is separate from the storage appliance;

acquiring, at the storage appliance, a first snapshot of the database at a first point in time from the server executing the database;

determining, by the storage appliance, that a quantity of one or more transaction logs for the database acquired between the first point in time and a second point in time exceeds a pre-determined threshold value, wherein the one or more transaction logs for the database include a set of data changes that have occurred to the database between the first point in time and the second point in time subsequent to the first point in time, and wherein the one or more transaction logs are acquired from the server at a frequency that is higher than the snapshot frequency for the database;

requesting, by the storage appliance based at least in part on determining that the quantity of one or more transaction logs acquired between the first point in time and the second point in time exceeds the pre-determined threshold value, that the server provide a second snapshot of the database at the second point in time;

detecting, by the storage appliance, that the server is unable to provide the second snapshot of the database to the storage appliance within a threshold time period that begins at a time that the server is requested to provide the second snapshot and that an amount of time between the first point in time and the second point in time is less than a second threshold time period determined based at least in part on the snapshot frequency;

determining, by the storage appliance, that a synthetic snapshot of the database is to be generated based at least in part on determining that the quantity of one or more transaction logs for the database exceeds a pre-determined threshold value and based at least in part on the detecting;

identifying, by the storage appliance, a database engine to generate the synthetic snapshot for the database;

generating, by the storage appliance, the synthetic snapshot by applying the set of data changes to the database using the database engine;

terminating, by the storage appliance, the database engine after generating the second snapshot using the database engine; and storing, within the storage appliance, the synthetic snapshot of the database.

17. The method of claim 16, wherein determining that the quantity of one or more transaction logs for the database acquired between the first point in time and the second point in time exceeds the pre-determined threshold value includes detecting that an aggregate file size for the one or more transaction logs is greater than a threshold file size.

* * * * *